Aug. 20, 1968 L. F. SANDERSON ET AL 3,397,522

COTTON HARVESTER

Filed July 6, 1965 3 Sheets-Sheet 1

INVENTORS
L. F. SANDERSON
R. W. HOOK
M. L. McCUNN

BY William A. Murray

ATTORNEY

Aug. 20, 1968  L. F. SANDERSON ET AL  3,397,522
COTTON HARVESTER

Filed July 6, 1965  3 Sheets-Sheet 2

INVENTORS
L. F. SANDERSON
R. W. HOOK
M. L. McCUNN

BY William A. Murray
ATTORNEY

Aug. 20, 1968       L. F. SANDERSON ET AL       3,397,522
COTTON HARVESTER

Filed July 6, 1965                              3 Sheets-Sheet 3

INVENTORS
L. F. SANDERSON
R. W. HOOK
M. L. McCUNN

William A. Murray
ATTORNEY

# United States Patent Office 3,397,522
Patented Aug. 20, 1968

3,397,522
COTTON HARVESTER
Leon F. Sanderson and Richard W. Hook, Des Moines, and Myron L. McCunn, Dallas Center, Iowa, assignors to Deere & Company, Moline, Ill., a corporation of Delaware
Filed July 6, 1965, Ser. No. 469,484
24 Claims. (Cl. 56—30)

ABSTRACT OF THE DISCLOSURE

A material conveying and separating structure for use on a cotton harvester that includes a chamber that receives a mixture of ripe and green bolls from a cotton harvester, a blower duct extending vertically from the chamber and with a blower directing air through the duct, and a communication duct that extends between the chamber and blower duct that operates to induce or draw the ripe bolls from the chamber.

---

This invention relates to a cotton harvester and more particularly relates to the discharge conveying mechanism for a cotton harvester.

In a conventional type cotton harvester in which there is provided a pair of row units on opposite sides of a tractor body that harvests and feeds harvested cotton bolls rearwardly to a discharge mechanism at the rear of the tractor, it has been conventional to provide an inclined elevator that feeds the material upwardly and rearwardly to a trailer also being pulled by the tractor. The means of conveyance is normally a flight-type conveyor that moves both ripe and green cotton bolls to the upper discharge end of the elevator. Positioned adjacent the rear discharge end is a blower mechanism that directs a stream of air through the material being discharged from the discharge end so as to drive the ripe or lighter cotton bolls into the trailer and permit the green cotton bolls to pass downwardly to be collected or to fall onto the ground. The problem that exists in this type of discharge is that it is difficult to collect the green cotton bolls and the elevator being inclined requires that the trailer is positioned considerably rearwardly of the tractor. Further, there is inefficiency in this method of discharge since the entire combination of ripe and green cotton bolls is moved through the entire cycle of harvesting and conveying and is separated only at the point of discharge of the elevator.

With the above in mind, it is the primary object of the present invention and consequently the present invention relates to a means of discharging cotton from a cotton harvester that includes a vertically disposed discharge duct having an upper swivel-type laterally extending discharge spout and a blower at the base of the discharge duct that directs a primary stream of air along the principal axis of the duct and towards the discharge spout. In combination with this type of discharge there is provided a transverse horizontal auger conveyor that receives and transfers material from the opposite row units on the tractor and moves the commingled ripe and green cotton bolls centrally inwardly to a paddle mechanism that drives the mixture of materials in a lateral rearward stream. A duct extension opens downwardly into the stream of commingled materials and extends therefrom upwardly and opens into the base of the vertical duct above the blower discharge and to one side of the discharge. Positioned beneath the stream of materials is a green boll catching container that opens upwardly into the stream. The high pressure of the primary stream of air induces a secondary stream of air in the duct extension. The induced secondary stream of air draws the ripe cotton bolls upwardly into the base of the duct and from thence the bolls are driven upwardly and outwardly to a trailer. The heavier or green bolls are permitted to gravitate into the green boll container.

Another object of the invention is to provide an adjustable air inlet in the duct extension above the stream of commingled ripe and green bolls to thereby regulate the separation between the ripe and green bolls.

Other objects and advantages of the invention will become apparent to those skilled in the art as the nature of the invention is better understood from the following description and as shown in the accompanying drawings.

Figure 1:
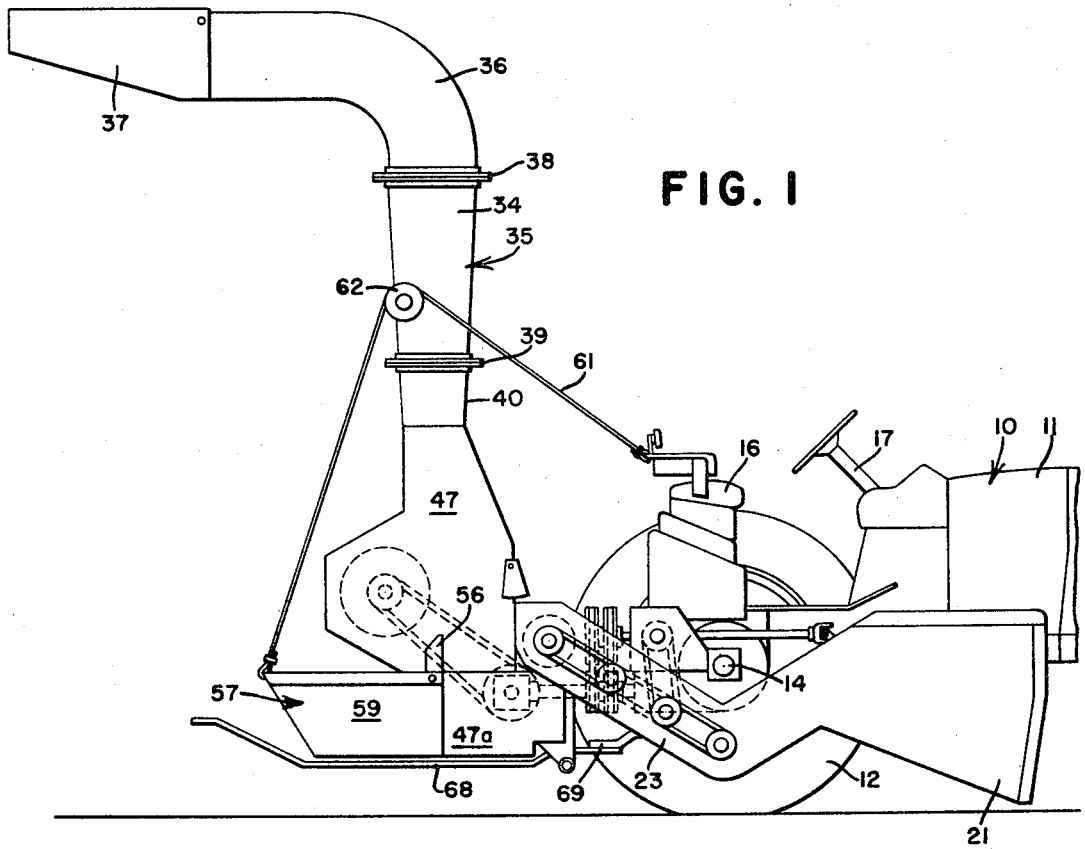
FIG. 1 is a side view of a harvester incorporating the present discharge conveyances and including a portion of a tractor.
Figure 2:
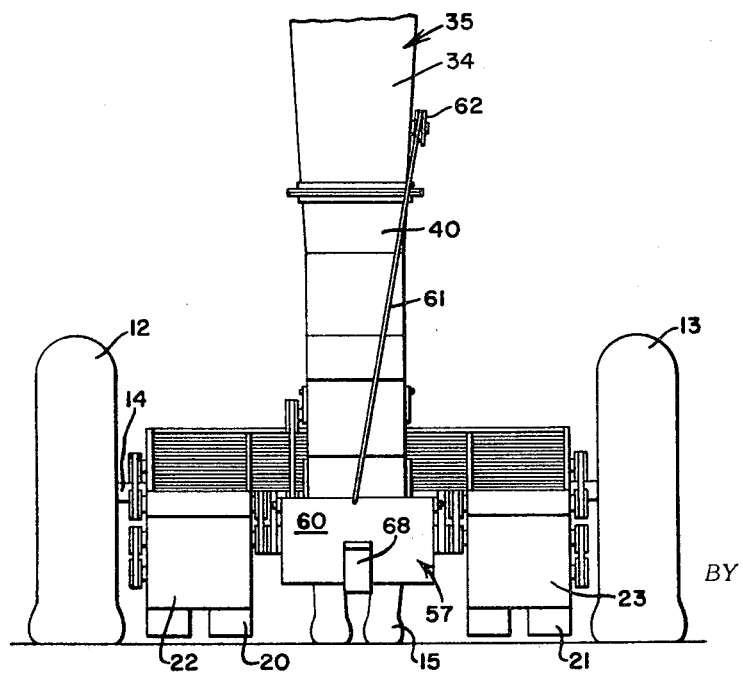
FIG. 2 is a rear view of the combination tractor and harvester.

A cotton harvester herein to be described is supported on a main support or tractor 10 having a fore-and-aft extending body 11 and carried at its rear on rear traction wheels 12, 13 on opposite ends of a transverse axle structure 14. The tractor body is supported at its forward end by front steerable wheels 15. An operator's station, as indicated by a seat 16 and steering wheel 17, is provided on the tractor body 11.

The harvester is composed of a pair of row units 20, 21 positioned on opposite sides of the tractor body 11 and forwardly of the axle structure 14. The harvesting row units may be of any of many conventional units. In this respect, U.S. Patent 2,533,510 which issued to M. W. Roscoe Dec. 12, 1950 shows and describes one of the more popular types of harvesters now on the market. Generally the harvester is composed of a forward harvesting mechanism disposed forwardly of the traction wheels 12, 13 that contacts the cotton plants and dislodges the cotton bolls from the plants. The cotton bolls are then transferred into a cleaning mechanism on the side of the harvesting mechanism and dispatched rearwardly to a pair of elevators 22, 23 extending from lower intake ends beneath the axle structure 14 upwardly and rearwardly to a pair of transversely spaced discharge ends rearwardly of the traction wheels.

A transverse auger structure 25 extends between the discharge ends of the elevators 22, 23 and includes an auger housing having a front and overhead closed portion 26 and a rear underlying grille portion 27, the latter forming with the housing portion 26 a transverse tube for receiving an auger device 28. The auger device 28 includes a pair of spiral helical flightings 29, 30 that feeds material from the discharge ends of the elevators 22, 23 to a central impeller portion 31. The impeller 31 is composed of a series of radial paddles that receives the cotton from the helical flightings 29, 30 and drives it rearwardly through a centrally located rear outlet 32.

Positioned rearwardly of the transverse auger structure 25 and directly in line with the outlet 32 is an upright cotton conveying mechanism including a vertical duct structure 35 having at its upper end an elbow 36 for directing material horizontally rearwardly through a discharge spout 37. The duct structure 35 includes upper and lower junctures 38, 39 at opposite ends of a central upright portion 34 that may be adjusted so that the elbow 36 and spout 37 may be directed forwardly, rearwardly, or to the sides. In many cotton harvesters there is provided a cotton receiving basket in an overhead relation to the tractor 10 and consequently it is desired to have the duct structure convertible for either this type of cotton basket or for discharging into a trailer. The portion 34 diverges outwardly in respect to the duct axis from the lower juncture 39. Continuing downwardly from the juncture 39 is a short vertical conveying section 40. The lower portion 40 may be treated as the base of the vertical duct structure 35. Provided beneath the base 40 of the duct structure 35 is a blower 41 having a housing 42 fixed to the vehicle slightly above and rearwardly of the outlet 32. Contained within the housing 42 is a horizontal rotor or fan member 43 that directs a stream of air through a vertical discharge duct or nozzle 44 terminating at an upwardly opening discharge 45. The discharge duct 44 is axially aligned and is located centrally in respect to the cross section of the duct structure 35 and is considerably smaller in cross section. The duct nozzle 44 directs the air upwardly substantially on the primary axis of the duct structure 35. The duct portions 34, 40 diverge above the nozzle opening 45 to accommodate the expanding air stream above the opening.

The base 40 of the duct structure 35 and the blower housing 42 have common side panels 46, 47 at the entire lower portion of the conveying mechanism. Extending between the side panels 46, 47 and continuing downwardly from the base 40 of the conduit structure 35 is a pair of downwardly and forwardly inclined panels 48, 49. The panel 48 continues downwardly and forwardly from the rear side of the base 40 to the upper rear edge of the conduit 44. The inclined panel 49 extends forwardly of the conduit 44 and has its rear under surface forming with the upper forward edge of the conduit 44 an inlet into the base 40 of the conduit above and to the forward side of the blower outlet 45. A vertical panel 50 extends downwardly from the lower edge of the inclined panel 49 to the overhead portion 26 of the transverse conveyor structure 25. The panels 49 and 50 form, therefore, with the forward upright panel of the housing 42 a vertical duct extension or chamber that opens into the base 40 of the duct structure 35. The chamber or duct extension opens downwardly into and receives the stream of material being discharged laterally rearwardly by the paddle members 31 through the outlet 32. The extension or chamber serves as communicating means and operates to draw the ripened cotton bolls upwardly through the extension or chamber into the base 40 of the duct structure. The chamber or duct extension includes, therefore, a vertical portion between the panel 50 and the forward side of the housing 42 and an upward and rearwardly inclined portion formed between the panel 49 and the upper and forward wall of the duct 44, the latter inclined portion opening as a ripe boll outlet, as previously mentioned, into the base 40 of the duct structure 35 above and to the side of the outlet 45. A noise muffling member 51 extends between the walls 46, 47 above the opening 45 and tends to deviate the movement of air to reduce the hum or roar of the air moving through the duct structure 35. A baffle member 52 is pivoted on the wall 50. It is between the material outlet 32 and nozzle opening 45. By adjusting the baffle 52 the amount and velocity of air moving through the duct extension may be regulated.

Figure 3:
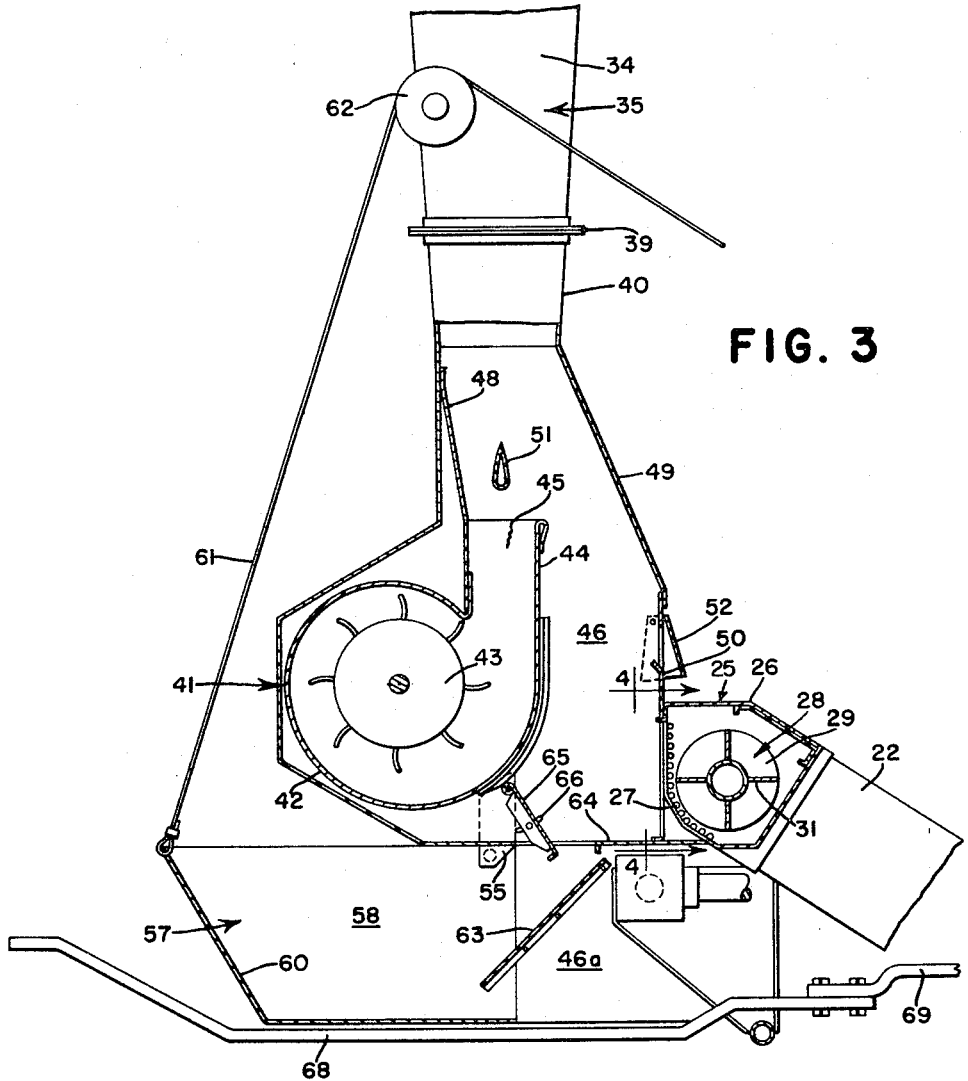
FIG. 3 is an enlarged vertical sectional view through a portion of the discharge conveying mechanism.
Figure 4:
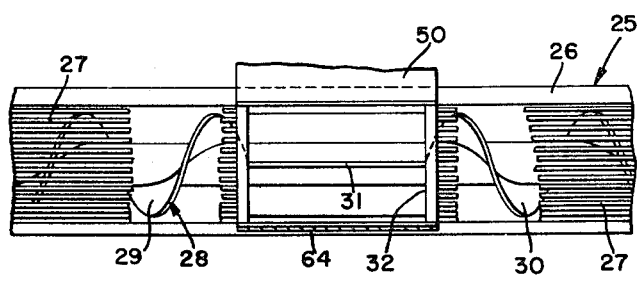
FIG. 4 is a sectional view taken substantially along the line 4—4 of FIG. 3.

A pair of upright brackets 55, 56 is fixed to the respective sides 46, 47 and has lower ends depending beneath the lower edges of the sides. Pivotally mounted on the lower ends of the brackets 55, 56 is a green boll catcher or container 57 composed of a pair of upright sides 58, 59 that lie alongside the brackets 55, 56 and are pivotally connected thereto at their forward upper edges. The sides 58, 59 are interconnected by a panel 60 at their lower edges and rear edges respectively. A cable 61 is connected to the upper edge of the panel 60 and extends upwardly over a pulley 62 to a forward or remote end connected to the seat 16. The container 57 opens forwardly. At the forward end of the container 57 and extending between downward extensions 46a, 47a of the sides 46, 47 is a panel 63 inclined downwardly and rearwardly. A horizontal panel 64 extends rearwardly from the under edge of the outlet 32 to a rear edge spaced forwardly from the surface of an inclined transverse baffle member 65 that may be adjusted in an angular slot 66. As may be readily apparent from viewing FIG. 3, the opening or green boll outlet defined by the rear edge of the panel 64 and the forward surface of the baffle 65 underlies the stream of laterally rearwardly directed material being thrown by the paddles 31 and permits the heavier bolls to gravitate onto the inclined panel 63 and from thence into the green boll catcher 57. The adjustabilty of the panel 65 serves to determine the size of the opening so as to regulate the amount of air moving through the lower portion of the duct. Since separation of the ripe from the green bolls may occur in this area it may be considered as a separating chamber.

Positioned beneath the container 57 is a drawbar extension 68 connected at its forward end to a tractor drawbar 69 mounted on the tractor 10. The rear end of the drawbar extension 68 may be connected to a suitable trailer. It should also be noted that the cable 61 may operate to lift the container 57 without interference with the drawbar extension 68.

There has thus been described an apparatus that receives and conveys cotton bolls from a cotton harvester which comprises a transverse auger structure that receives harvested bolls from a pair of harvesting row units and moves the bolls inwardly to a central outlet 32 that opens rearwardly. The auger flights 29, 30 move the material inwardly to radial paddles 31 that drive the cotton bolls in a lateral rearward stream into a blower-conveyor. The conveyor is composed of an upright or vertical duct system 35 having a base 40 for receiving the cotton bolls and further includes a blower 41 with a vertical discharge conduit or nozzle 44 beneath the base 40 and centrally located relative to the cross section of the base 40 and directs a high velocity stream of air axially in respect to the duct structure 35. The duct extension, composed of the panels 49, 50 and the forward panel of the housing 42, is offset to one side of the nozzle 44 and opens downwardly into the stream of materials leaving the outlet 32. The differential in pressure between the primary stream of air and the surrounding area induces air movement upwardly in the extension and guides the ripe bolls upwardly into the duct structure 35 with entrance therein at a point above the outlet 45 and to one side of the outlet. The ripe bolls then enter the main stream of air and are driven through the duct structure 35, the elbow 36, and spout 37. The amount of air bled through the opening at the baffle 52 controls the air velocity beneath the baffle and thereby regulates the separation of the ripe and green bolls. The green boll container 57 is disposed beneath the stream and opens upwardly to gather the green cotton bolls and other heavier material gravitating through the stream. The container 57 may be emptied by an operator on the seat 16 pulling on the cable or rope 61 so as to raise the rear end of the container 57 and tilt the container downwardly so that material is discharged over the forward edge of the container. Upon slack being applied in the line 61, gravity will return the container 57 to its horizontal or boll-catching position.

Figure 5:
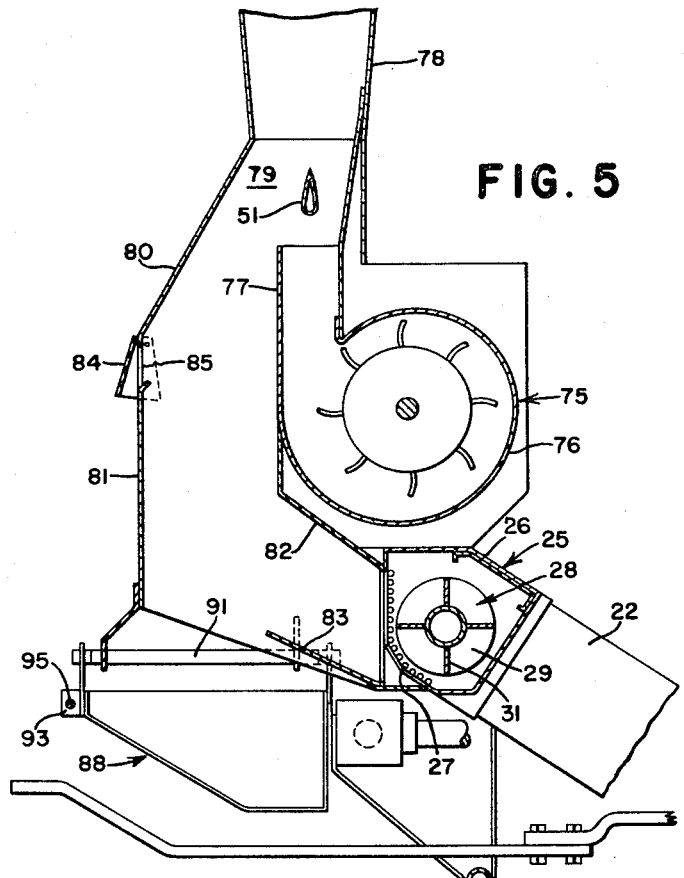
FIG. 5 is a sectional view similar to FIG. 3 but showing a slight modification in the form of the invention.
Figure 6:
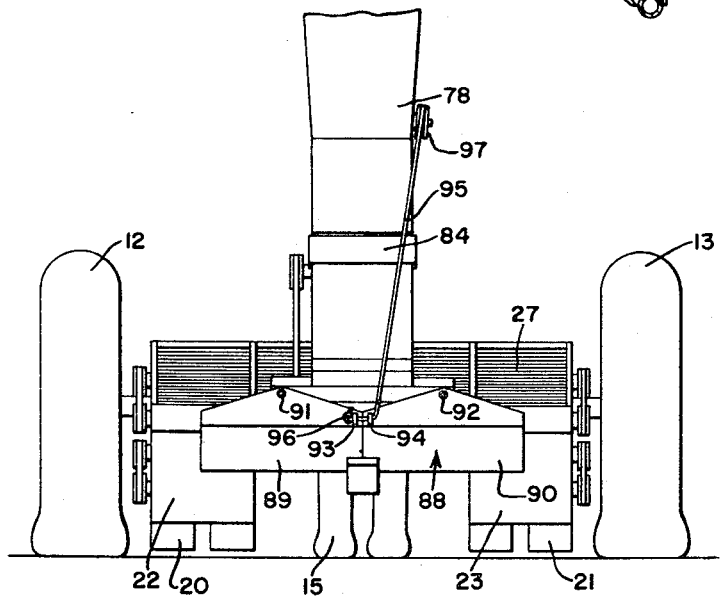
FIG. 6 is a view similar to FIG. 2 but showing the modification of the invention.

In the form of the invention shown in FIGS. 5 and 6, a blower 75 is positioned directly above the transverse housing structure 26 and is supported thereon. The blower 75 includes a blower housing 76 having a vertical discharge conduit or nozzle 77 centrally located relative to the lower or base end of a diverging vertical discharge duct 78. The duct 78 and blower 75 have common vertically extending sides 79. A duct extension is positioned rearwardly of the housing 76 and conduit 77 and includes an upper downwardly and rearwardly inclined transverse wall 80 and a vertical lower wall 81 extending downwardly from the lower end of the inclined wall 80. Both walls 80, 81 are spaced rearwardly of the conduit 77 in the housing 76. A panel means 82 is forwardly opposite the vertical wall 81 and has an inclined portion that extends rearwardly from the outlet 32 of the transverse housing structure 26. An inclined under panel 83 is provided opposite the inclined portion of the panel 82 and generally guides the stream of material being discharged by the central paddle portion 31 of the transverse conveyor rearwardly. The primary stream of air leaving the nozzle 77 induces a secondary stream of air in the vertical portion of the duct extension, as defined by the rear wall 81 and the rear panel of the housing 76 and partially by the panel 82. The duct extension opens downwardly into the stream of material for the purpose of sucking or drawing the ripe cotton bolls upwardly into the secondary stream of air. The inclined panel 80 is spaced rearwardly of the upper discharge edge of the conduit 77 and forms an inclined portion of the duct extension that opens into the base 78 of the duct rearwardly of and above the discharge of the conduit 77. Pivotally mounted on the side walls 79 is a baffle member 84 positioned over an opening 85 in the rear panel 81. The baffle 84 may be adjusted to open or close the opening 85 and to thereby control the degree or amount of suction created in the duct extension and thereby the separation of the ripe bolls from the commingled stream of ripe and green bolls.

The edge of the panel 83 is spaced from the forward side of the wall 81 and describes therewith a discharge outlet that permits the heavier green bolls and other heavier material to gravitate into a bowl or container 88. The container 88 is composed of two complementary portions 89, 90 having front and rear upright sides pivoted on fore-and-aft extending pivot rods 91, 92. As may be seen from viewing FIG. 6, the container portions 89, 90 are separable along a vertical fore-and-aft extending plane substantially on the fore-and-aft center line of the tractor. A pair of brackets 93, 94 project rearwardly from the rear wall of the respective portions 89, 90 and are suitably apertured so as to receive a line or rope 95. The rope has a knot 96 at the end passing through the apertures and extends therefrom upwardly over a pulley 97 that redirects the line for connection to the tractor seat 16. When it is desired to dump or discharge the green bolls in the container 88, slack is played into the rope 95 and the gravitational effect of the containers and the material in the containers will cause the central or inner portions of the container portions 89, 90 to tilt or to dump the material. When it is desired to again place the portions 89, 90 in transverse horizontal alignment, tension is applied in the rope 95 and the two sections move into the desired position.

Thus in the modified form of the invention there has been described a material conveying means that includes a blower 75 supported directly over the transverse auger structure 25 and having a discharge conduit 77 directed upwardly centrally and axially into the duct 78. The duct extension is disposed rearwardly of the conduit 77 and opens downwardly into the stream of materials leaving the transverse conveyor 25 and moves the material upwardly to be introduced into the base 78 of the duct above and to one side of the discharge end of the conduit 77.

In both forms of the invention there has thus been described apparatus that includes a boll catcher or container that is pivotally mounted on the conveying structure to be tilted so that material may be discharged therefrom. In both forms of the invention the container is operated by a cable that extends to a remote position, in the present instance the operator's station on the tractor, and operates to position the container between the dump and material receiving positions.

While only two forms of the invention have been shown, it should be recognized that other forms and variations will occur to those skilled in the art. Therefore while the preferred forms have been shown and described for the purpose of clearly and concisely illustrating the principles of the invention, it should be understood that there is no intention to limit or narrow the invention beyond the broad concepts set forth in the appended claims.

What is claimed is:

1. A discharge conveying structure for a vehicle-mounted cotton harvester, comprising: a cotton receiving transverse ouger structure including a transverse housing supported on the vehicle and having an outlet; auger means within the housing for driving material to the outlet and a material impelling portion moving material in a lateral stream through the outlet; a discharge conveyor including a discharge duct with an intake end, and a blower having a blower discharge located adjacent the intake end to direct a primary stream of air through the duct, the blower discharge being offset from the outlet; and a duct extension extending from the transverse housing outlet to the duct and opening into the duct downstream of the blower discharge to thereby induce a secondary stream of air through the extension.

2. The invention set forth in claim 1 further characterized by a material container supported on the vehicle in underlying relation to and in communication with said duct extension adjacent said housing outlet for gathering heavy particles gravitating from the stream.

3. The invention set forth in claim 1 in which the blower has a vertical discharge conduit axially coextensive with the primary axis of the duct and substantially smaller in cross section than the duct.

4. The invention set forth in claim 3 in which the duct extension opens into the base of the duct offset to one side of the conduit and above the mouth of the conduit discharge.

5. The invention set forth in claim 1 further characterized by an adjustable opening in the duct extension above the outlet and between the outlet and intake end of the duct for regulating the effectiveness of the secondary stream in respect to the materials moving in the stream of materials.

6. The invention set forth in claim 1 in which the blower is supported on the vehicle above the transverse housing and has a vertical discharge conduit terminating in the blower discharge; and the duct extension is composed of a lower vertical portion alongside the conduit and an upper portion at least partially above the conduit and inclined toward and opening into the duct above the blower discharge.

7. The invention set forth in claim 1 in which the blower is supported on the vehicle above the transverse housing and has a vertical discharge conduit terminating in the blower discharge; and the duct extension is composed of a lower vertical portion rearward and alongside the conduit and an upper portion at least partially above the conduit and inclined forwardly toward and opening into the duct above the blower discharge.

8. The invention set forth in claim 1 in which the duct is rearwardly offset from the outlet and the blower is supported on the vehicle and has a vertical discharge conduit rearwardly of the outlet and terminating in the blower discharge; and the duct extension is composed of a lower vertical portion alongside the conduit and an upper portion at least partially above the conduit and inclined toward and opening into the duct above the blower discharge.

9. The invention set forth in claim 2 in which the container is pivotally supported on the vehicle to move between a tilted position for discharging the material and a non-tilted position for retaining the material.

10. The invention set forth in claim 9 in which the container is an upwardly opening box-like structure composed of two transversely coextensive complementary parts and each part is supported on a fore-and-aft extending pivot whereby the parts may tilt downwardly for discharging the material.

11. The invention set forth in claim 9 further characterized by a control element operable from a remote area and connected to the container for effecting position thereof.

12. A cotton harvester adapted to be supported on a mobile vehicle having an elongated fore-and-aft extending body supported on traction wheels spaced from the body, comprising: a pair of fore-and-aft extending row units supported on the vehicle on opposite sides of the body and forward of the traction wheels and including a pair of fore-and-aft extending conveyors disposed between the wheels and body and having a pair of transversely spaced discharge ends rearwardly of the traction wheels; a transverse auger structure extending between the discharge ends including a transverse housing supported on the vehicle rearwardly of the traction wheels and including a central outlet opening rearwardly; auger means within the housing for driving material inwardly from the discharge ends to the outlet and including a central material impelling portion for moving material through the outlet; a discharge conveyor including a vertical duct; a blower at the base of the duct having a blower discharge located for directing air axially upwardly in the duct, the blower discharge being vertically offset above the central outlet; and a vertical duct extension extending upwardly from said housing adjacent the central outlet to the base of the duct and opening into the duct beyond the blower discharge.

13. A cotton harvester adapted to be supported on a mobile vehicle having an elongated fore-and-aft extending body supported on traction wheels spaced from the body, comprising: a pair of fore-and-aft extending row units supported on the vehicle on opposite sides of the body and forward of the traction wheels and including a pair of fore-and-aft extending conveyors disposed between the wheels and body and having a pair of transversely spaced discharge ends rearwardly of the traction wheels; a transverse auger structure extending between the discharge ends including a transverse housing supported on the vehicle rearwardly of the traction wheels and including a central outlet opening rearwardly; auger means within the housing for driving material inwardly from the discharge ends to the outlet and including a central material impelling portion for moving material in a lateral rearward stream through the outlet; a discharge conveyor including a vertical duct offset rearwardly of the outlet; a blower at the base of the duct having a vertical blower discharge conduit located centrally in respect to the cross section of the duct and directing air upwardly along the primary axis of the duct; and a vertical duct extension extending upwardly from said housing adjacent the central outlet to the base of the duct and opening into the duct above and to a side of the conduit.

14. A discharge conveying structure for a vehicle-mounted cotton harvester having a material outlet and a material impelling means for moving material in a stream through the outlet, the conveying structure comprising a discharge conveyor including a vertical duct and a blower at the base of the duct having a blower discharge located in respect to the duct for directing air axially upwardly of the duct, the blower discharge being offset from the outlet; a duct extension extending from the housing adjacent the outlet to the duct and opening into the duct adjacent the base; and a container supported on the vehicle beneath the outlet so as to underlie the stream of material and opening upwardly to receive the heavier material gravitating from the stream.

15. A discharge conveying and separating mechanism for use with a cotton harvester having discharge means in which cotton is discharged in a commingled mixture of ripe and green bolls, comprising: a separating chamber in material receiving relation to the discharge means for receiving the mixture; a duct structure projecting from the chamber and having an intake end offset from the chamber; a blower having an outlet directed into the intake end of the duct directing a primary stream of air through the duct; communicating means between the separating chamber and duct opening into the duct whereby the primary stream of air will induce a secondary stream of air in the chamber for drawing the ripe bolls from the mixture and moving them into the duct; and air regulating means on the separating chamber for effecting the intensity of the secondary stream in relation to the mixture.

16. The invention defined in claim 15 in which the duct is vertically disposed, the separating chamber is at the base thereof, the blower outlet is directed upwardly, and the communicating means is an opening between the chamber and duct above the blower outlet.

17. The invention defined in claim 15 further characterized by a sound suppressing member disposed within the duct adjacent to the blower outlet and in the path of the primary stream.

18. The invention defined in claim 16 in which the blower outlet and the opening of the communicating means open into the duct and are closely adjacent to one another with one being substantially on the main axis of the duct and the other being offset from the axis and adjacent said one outlet.

19. The invention defined in claim 15 in which the primary stream of air is introduced into the duct through the blower outlet and is directed along the primary axis of the duct and the opening of the communicating means into the duct is offset from the axis.

20. The invention defined in claim 15 further characterized by the main duct having walls diverging downstream in relation to the blower outlet.

21. A discharge conveying structure for a vehicle-mounted cotton harvester, comprising: a cotton receiving transverse auger structure including a transverse housing supported on the vehicle and having an outlet opening rearwardly; auger means within the housing for driving material to the outlet and a material impelling portion moving material in a lateral rearward stream through the outlet; a discharge conveyor including a vertical duct and a blower disposed to direct air upwardly into the base of the duct and having a blower discharge located in respect to the cross section of the duct to direct air upwardly along the primary axis of the duct, the blower discharge being vertically offset above the outlet; a vertical duct extension adapted to receive the lateral stream of material issuing from the outlet and extending therefrom upwardly to open into the base of the duct above and to a side of the blower discharge; and a material container beneath the duct extension and in communication therewith for catching gravitating material.

22. A conveying and separating structure for use with a cotton harvester having a main support and harvesting mechanism thereon adapted to harvest both ripe and green cotton bolls and having discharge means for discharging them in a commingled mixture of ripe and green bolls comprising: a container carried on the support and disposed to receive cotton bolls from the discharge means; a blower carried by the support and having an outlet offset from and directed away from the container; a conveying duct carried by the support and extending from the outlet in a downstream relation thereto whereby air will move from the outlet through the duct; and an extension duct opening into and extending from the conveying duct to a material intake end adjacent the discharge means whereby air flow may be induced into the extension duct by air flowing through the main duct to thereby draw off the ripe bolls from the ripe and green boll mixture and move the ripe bolls into the conveying duct while permitting the green bolls to be deposited in the container.

23. A discharge conveying and separating mechanism for use with a cotton harvester with discharge means discharging in a stream a commingled mixture of ripe and green cotton bolls comprising: a chamber in communication with the discharge means and having an upper ripe boll outlet and a lower green boll outlet; and upwardly extending conveyor duct having a base in communication with the upper outlet; a blower having a blower discharge in communication with the base of the duct and for directing air upwardly through the duct and to thereby effect an induced air flow through the chamber and upper outlet; and a material container beneath and in communication with the lower outlet for receiving green cotton bolls.

24. The invention defined in claim 23 in which the blower duct is vertical and has an elbow at its upper end with a horizontal extension that directs the cotton into a ripe boll container.

References Cited

UNITED STATES PATENTS

| | | | |
|---|---|---|---|
| 911,802 | 2/1909 | Baldwin. | |
| 2,406,058 | 8/1946 | Boone | 56—33 |
| 2,673,438 | 3/1954 | Miller et al. | 56—30 |
| 2,807,925 | 10/1957 | Andrews | 56—12 |
| 2,820,989 | 1/1958 | Bopf | 56—30 X |
| 2,833,409 | 5/1958 | Sisulak | 56—12 X |
| 2,861,298 | 11/1958 | Fowler | 209—137 |
| 1,885,437 | 11/1932 | Harazin | 302—21 |

RUSSELL R. KINSEY, *Primary Examiner.*